March 31, 1925.  
C. J. LAUER  
SEPARATOR  
Filed Sept. 25, 1924  
1,531,485
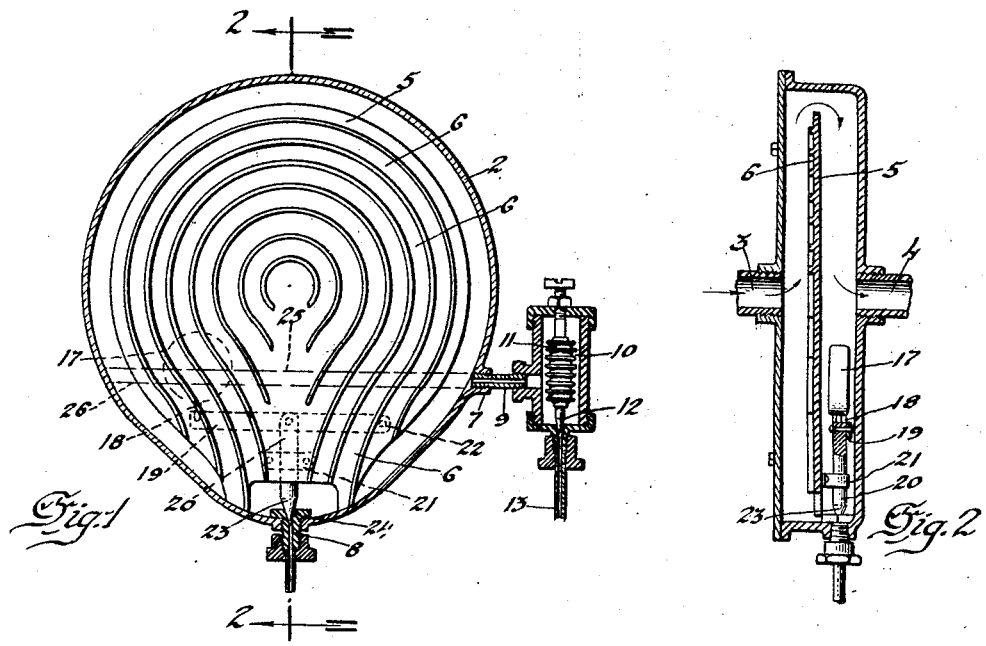
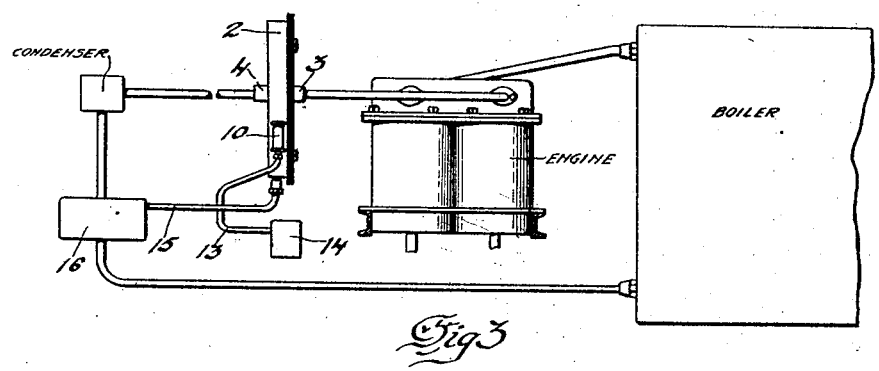
INVENTOR  
Carleton J. Lauer  
BY HIS  
ATTORNEY Patented Mar. 31, 1925.

1,531,485

UNITED STATES PATENT OFFICE.

CARLETON J. LAUER, OF STRATFORD, ONTARIO, CANADA, ASSIGNOR TO BROOKS STEAM MOTORS LTD., OF TORONTO, ONTARIO, CANADA, A CORPORATION OF ONTARIO.

SEPARATOR.

Application filed September 25, 1924. Serial No. 739,885.

*To all whom it may concern:*

Be it known that I, CARLETON J. LAUER, a citizen of the United States, residing at Stratford, Ontario, Canada, have invented certain new and useful Improvements in Separators, of which the following is a specification, reference being had to the accompanying drawings.

In the operation of the steam plant contained in an automobile propelled by steam forces, it is customary to convert the exhaust steam into water and re-use the same in the operation of the plant.

Considerable difficulty has been experienced in doing this for the reason that a greater or lesser amount of oil has been found to mix with the condensed water which oil settles in the boiler of the steam plant and decreases the efficiency thereof.

It is one of the prime objects of my invention to provide means for separating the said water and oil so as to overcome this difficulty and at the same time allow the re-using of the water.

It is a further object of my invention to provide such means of a novel and simple nature, of inexpensive construction and automatic in its operation.

With these and other objects in view, my invention consists in the arrangement, combination and construction of the various parts of my improved mechanism as described in the specification, claimed in my claims and shown in the accompanying drawings in which:

Fig. 1 is a view showing a separator tank in section with my improved mechanism attached thereto.

Fig. 2 is a sectional view taken on line 2—2 of Fig. 1.

Fig. 3 is a view showing in elevation, a separator tank such as that used in my improved mechanism.

In the construction of my improved mechanism, I provide a separator tank 2 having a steam inlet port 3 and a steam outlet port 4 on opposite sides thereof, and a baffle plate 5 mounted therein and having a series of corrugations 6 on one side thereof opposite the intake port 3.

I also provide in the separator tank 2, drain ports 7 and 8. The port 7 is connected through the tubing 9 with a chamber 10 which said chamber is provided with a thermostat 11 therein having on its lower end a nipple 12 for closing the connection between the said chamber 10 and the tubing 13 leading to the tank or reservoir 14. The outlet 8 is connected by means of tubing 15 with a tank or reservoir 16.

Also attached within the said separator tank 2 is a float mechanism consisting of a float member 17 attached by the member 18 to the lever 19. Lever 19 is attached intermediate its ends to a pin 20, which said pin is guided in the member 21 attached to the side of the separator 2 and is provided with a tapered end 23 adapted to seat in tapered opening 24 in the drain port 8. The lever 19 is pivoted at its opposite end at 22 to the side of the separator.

In the practical operation of my improved device, exhaust steam will be admitted through the intake port 3 and will be flattened against the baffle plate 5 with the result that the oil and a considerable portion of the water contained therein, because of their weight, will adhere to the said plate and follow the corrugations 6 downwardly and form a pool in the bottom of the separator. The lighter steam will pass over and around the baffle plate 5 and out through the outlet port 4.

The pool formed in the bottom of the separator 2 will be composed of a mixture of water and oil, the oil naturally going to the top of the pool, as shown by the oil level 25 and the water level 26 in the drawings.

The thermostat 11 in the chamber 10 will normally hold the passageway leading into the tank 14 closed by reason of the heat exerted therethrough by the steam coming into the separator. When the pool has gained sufficient depth, however, so as to allow the oil level to reach the outlet 7 and the oil to flow therethrough, then because of the coolness of the oil, the thermostat 11 will cause the point 12 to be lifted and permit the oil to flow out through the tubing 13 into the tank 14.

As soon as the oil has been exhausted and the hotter steam or water passes through the outlet 7, the thermostat 11 will expand causing the point 12 to close the opening between the chamber 10 and the tubing 13 thus preventing the flow of water through the tubing 13 and into the tank 14.

The float 17 is so arranged that when the pool reaches a predetermined level, the pin 20 will be raised, thus disengaging the connection made between the tapers 23 and 24 and permitting the water to flow through the drain port 8 and the tubing 15 into the reservoir 16.

It will thus be seen that I have provided means for separating the oil and the water removing both from the separator and placing each in a separate receptacle, all of which is done automatically and without any attention whatever from the operator.

It is obvious that some changes will be made in the arrangement, combination and construction of the various parts of my improved device without departing from the spirit of my invention therein, and I do not wish to limit myself to the exact structure shown, it being my intention to cover by my claims such changes as may be reasonably included within the scope thereof, particularly a hand operated valve or other non-automatic means may be provided in the bottom of the separator whereby the liquid which collects therein, both water and oil, may be periodically drawn off.

What I claim is:

1. A device of the class described comprising a chamber, means therein for separating condensed water and oil from steam, a normally closed drain for said oil and means controlled by the level of the oil in said container for opening said drain.

2. A device of the class described comprising a chamber, means therein for separating condensed water and oil from steam, a normally closed drain for said oil and means controlled by the level of the oil in said container for opening said drain, said means consisting of a thermostatically operated valve adapted to open when contacted with oil and close when contacted with steam.

3. In combination, a chamber having a steam inlet and a steam outlet, means therein for separating oil and condensed water from said steam, means for collecting said water and oil in said chamber, a normally closed drain for said oil and means for automatically opening said drain when said oil has reached a pre-determined level.

4. A device of the class described comprising a chamber, means therein for separating condensed water and oil from steam, a normally closed drain for said oil, means controlled by the level of the oil in said container for opening said drain, and automatic means for draining at least a portion of said water from said chamber when it has reached a pre-determined level.

5. In combination, a chamber having a steam inlet and a steam outlet, means therein for separating oil and condensed water from said steam, means for collecting said water and oil in said chamber, a normally closed drain for said oil, means for automatically opening said drain when said oil has reached a pre-determined level and automatic means for draining at least a portion of said water from said chamber when it has reached a pre-determined level, said means consisting of a float operated valve.

6. In combination, a chamber, having a steam inlet and a steam outlet, a baffle plate disposed between the two and adapted to separate oils and condensed water from said steam, means for collecting said oils and waters in said chamber and means automatically operated for draining at least a portion of said oil when it has reached a pre-determined level and further means for automatically draining at least a portion of the water when it has reached a pre-determined level.

CARLETON J. LAUER.